Figure 1:
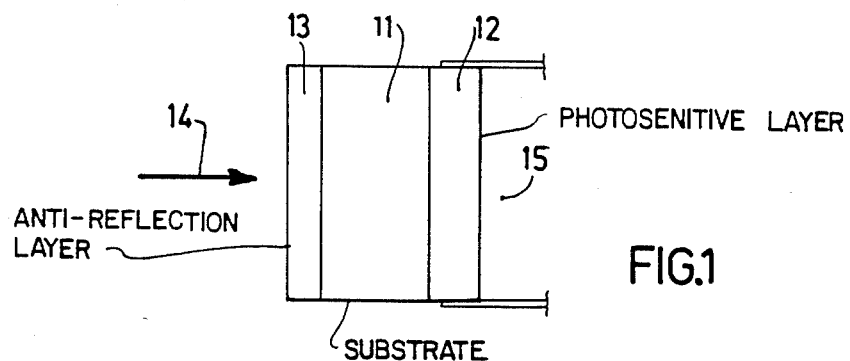

United States Patent [19]

Dolizy et al.

[11] Patent Number: 4,611,114
[45] Date of Patent: Sep. 9, 1986

[54] PHOTOELECTRIC DETECTION STRUCTURE HAVING SUBSTRATE WITH CONTROLLED PROPERTIES

[75] Inventors: Pierre Dolizy, Ris-Orangis; Francoise Groliere, Nogent-sur-Marne; Francois Maniguet, Fontenay-Tresigny, all of France

[73] Assignee: U.S. Philips Corporation, New York, N.Y.

[21] Appl. No.: 785,087

[22] Filed: Oct. 4, 1985

Related U.S. Application Data

[63] Continuation of Ser. No. 439,461, Nov. 5, 1982, abandoned.

[30] Foreign Application Priority Data

Nov. 13, 1981 [FR] France .................. 81 21249

[51] Int. Cl.⁴ .............................................. H01J 40/14
[52] U.S. Cl. .................................. 250/211 R; 350/1.1; 350/164; 250/338
[58] Field of Search ............ 250/211 J, 211 R, 338 R, 250/338 SE; 357/30; 350/1.1, 1.3, 1.4, 1.6, 163–166

[56] References Cited

U.S. PATENT DOCUMENTS 2,768,265  10/1956  Jenness, Jr. ............... 350/1.1 X
2,997,590   8/1961  Lyons et al. .............. 350/1.1 X
4,047,804   9/1977  Stephens ..................... 350/164

Primary Examiner—Edward P. Westin
Attorney, Agent, or Firm—Paul R. Miller

[57] ABSTRACT

A photoelectric detection structure of the present invention comprises a photosensitive layer deposited on a substrate consisting of a material transparent to radiation of visible light and of the near infrared light. The substrate has a refractive index for this radiation in the order of 2 with the substrate comprising on its surface incident to the radiation a structure to reduce the reflection of the radiation on that surface.

12 Claims, 5 Drawing Figures

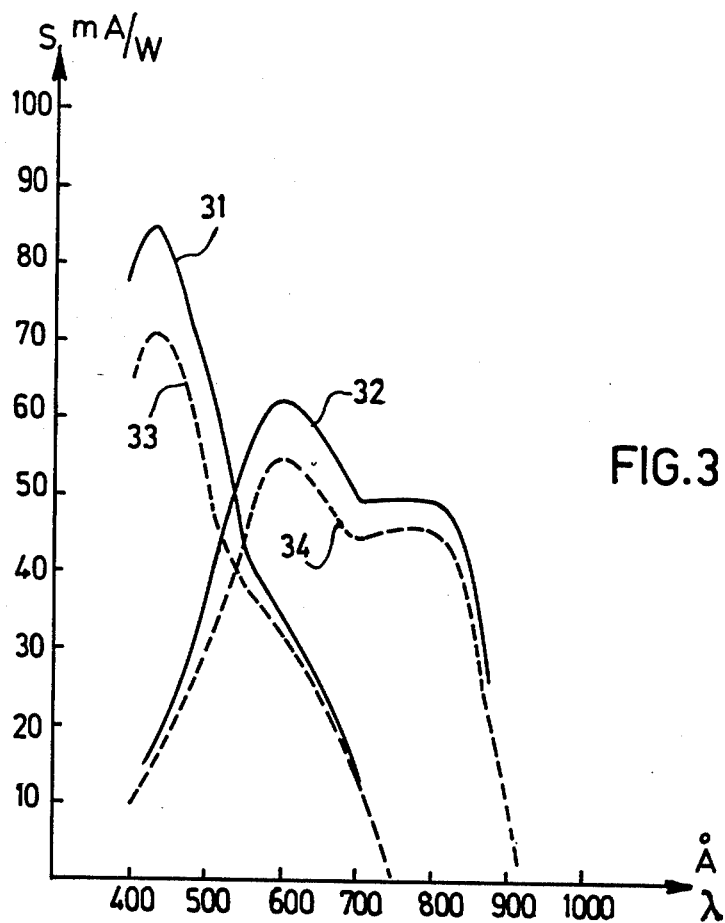
FIG.3
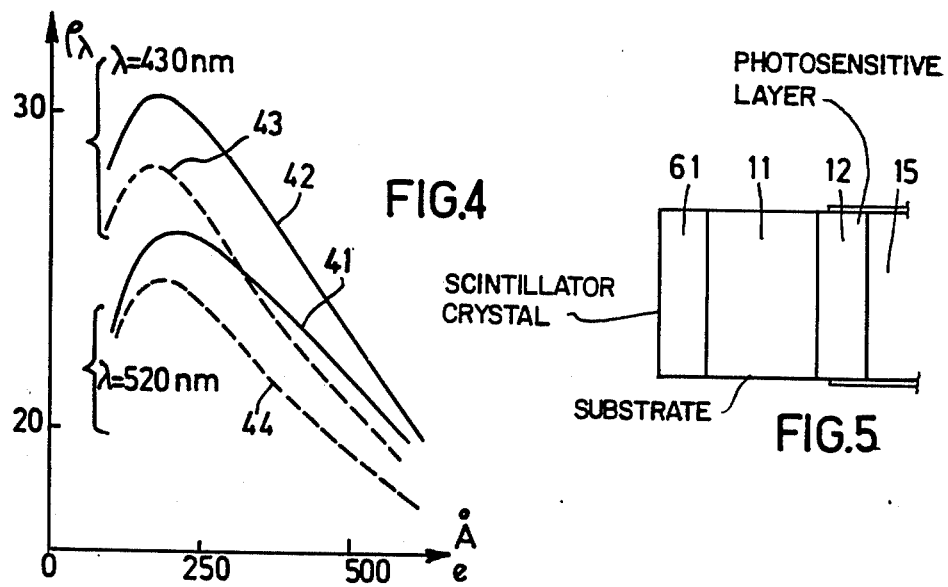
FIG.4
FIG.5

PHOTOELECTRIC DETECTION STRUCTURE HAVING SUBSTRATE WITH CONTROLLED PROPERTIES

This is a continuation of application Ser. No. 439,461, filed Nov. 5, 1982, now abandoned.

The invention relates to a photo-electric detection structure comprising a photosensitive layer on a substrate, which substrate is transparent to incident radiation from the visible range and from the near infra-red and which substrate has the shape of a plane-parallel, convex, or concave plate having such restricted curvatures that the angle of incidence of the rays in a radiation beam does not exceed 15 to 20°.

An application of the present invention is in particular a detection structure which is useful in gammagraphy. The invention is used in devices which comprise such a photo-electric detection structure at their inputs, for example, photo-electric cells, image intensifier tubes, television camera tubes and photo-multipliers. When the photo-electric detection structure used in these devices comprises a photosensitive layer which is deposited directly on the substrate, the result generally is a bad optical adaptation of the photosensitive layer on the substrate so that a great part of the light incident on the substrate is not used for the conversion of photons into electrons and as a result of this the efficiency of the photo-electric detection of the structure is poor.

It is known from U.S. Pat. No. 3,254,253 to improve this efficiency by reducing the reflection phenomena occuring at the interface substrate-photosensitive layer. This may be done by means of at least one intermediate layer which is transparent to the incident radiation and which is provided between the substrate and the photosensitive layer and the refractive index of the material of the intermediate layer is between that of the material of the substrate and that of the material of the photo sensitive layer (in the order of 1.5 and 3, respectively). The thickness of the intermediate layer must be adjusted so that, taking into account the optical constants of the material of the substrate and the material of the photo sensitive layer, the light which is reflected at the interface substrate-intermediate layer and the light which is reflected at the interface intermediate layer-photosensitive layer has substantially the same amplitude but is of opposite phase so that the two reflected light quantities compensate each other mutually by interference. Providing the intermediate layer in an accurate thickness makes the construction of the structure difficult. In order to minimize the losses by reflection at the interface between substrate and photo-electric layer, a substrate may be chosen having a higher refractive index than that of normal glass. This is what is partly described in "Actualités R.T.C.", No. 41, April 1978, pp. 22-23, in which the photo-electric layer is provided on the surface of a beam of photo-conductive fibers having a core glass of a lanthanum glass with a refractive index of 1.9. However, this device has two disadvantages. On the one hand the structure is adapted in particular to detection for image transmission, due to the optical fibers with which it is provided, and is much less suitable (due to the fibers) for a quantitative detection without image formation. On the other hand, due to the higher refractive index of the fiber core glass with respect to air a poor optical adaptation on the input side of the structure results.

It is the object of the invention to provide a photoelectric detection structure having an easily realizable construction as a result of the absence of an intermediate layer between substrate and photosensitive layer, without the photo-electric efficiency decreasing. Another object of the invention is that the structure is suitable for quantitative detection of photon phenomena. For this purpose the invention suggests to use as a substrate for the photosensitive layer a solid plate of transparent material having a refractive index in the order of 2. Furthermore, in order to avoid a bad optical adaptation of the structure on the side of the input face it comprises means to reduce the reflection of radiation at this face. These means are in particular an anti-reflection layer of known composition.

According to a modified embodiment of the invention the substrate consists of lanthanum glass having an index of approximately 1.9.

According to another modified embodiment the optical adaptation means at the input face of the substrate for the photo-sensitive layer consist of a scintillator crystal block for gammagraphy, for example, a crystal (CsI, Na) or (CsI, Tl), which are materials having a refractive index in the order of 1.8, bonded directly to the substrate with the high refractive index of the material of the block which is near the refractive index of the substrate obtaining the desired optical adaptation. In this case the invention consists of a detection structure which may be used, for example, in gammagraphy or spectrometry of X photons.

Figure 2:
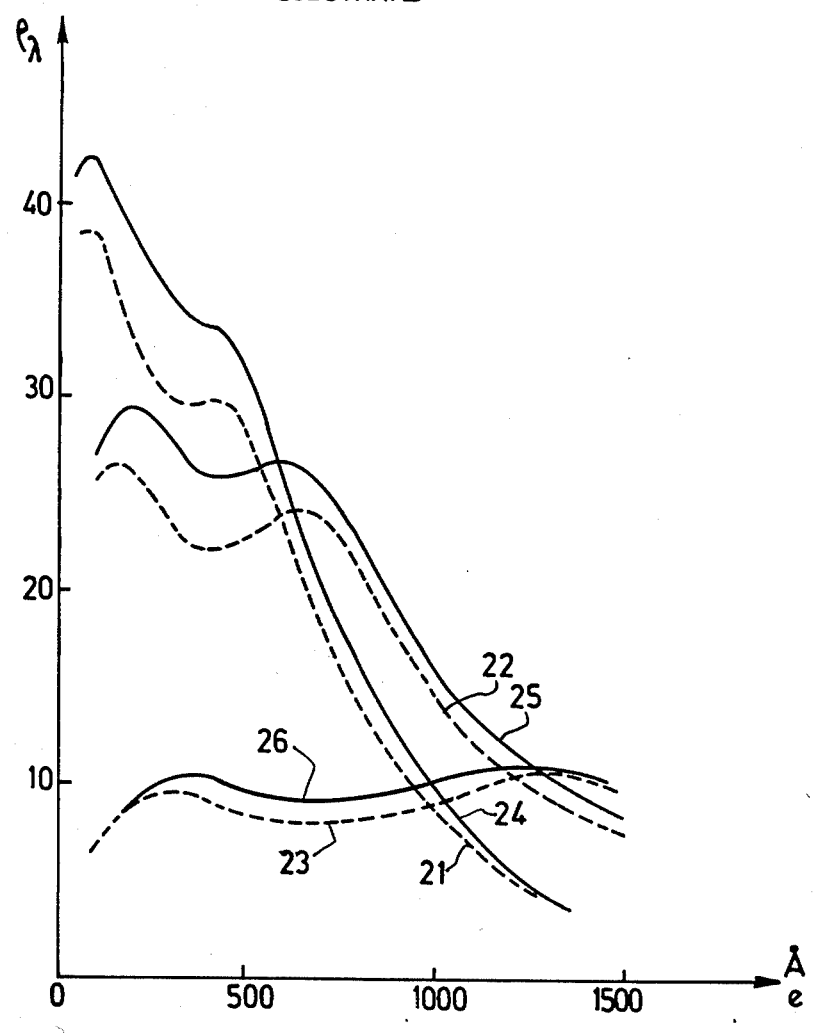

The invention will now be described in greater detail, by way of example, with reference to the accompanying drawing, in which FIG. 1 is a diagrammatic-sectional view of the photo-electric structure according to the invention, FIG. 2 shows curves of the photo-electric efficiency as a function of the thickness of the photosensitive layer of a photo-electric detection structure according to a first embodiment of the invention in which the photosensitive layer is tri-alkaline with formula (Sb Na$_2$ K, Cs) compared with the efficiency of the same photosensitive layer deposited on normal glass, FIG. 3 shows curves of the spectral sensitivity of the structure according to the first embodiment having a layer S 20 or S 25 and those of the same layers deposited on normal glass, FIG. 4 shows curves of the photo-electric efficiency as a function of the thickness of the photosensitive layer of a photoelectric detection structure according to a second embodiment of the invention in which the photosensitive layer is bi-alkaline with chemical formula Sb K$_2$ Cs, compared with the efficiency of the same layer deposited on normal glass, and FIG. 5 is a sectional view of a third embodiment of the invention comprising a scintillator crystal at its input.

FIG. 1 shows the structure according to the invention comprising the substrate which consists of a plate 11 which is transparent to radiation of the visible light and of the near infra-red, a photosensitive layer 12 having a thickness e and the anti-reflection layer 13 on the side of the substrate which is present opposite to the side comprising the photosensitive layer. In FIG. 1 the sides of the plate 11 are assumed to be flat and parallel. However, the invention also relates to the case in which the faces are concave or convex with the curvatures of the faces being restricted so that the angle of incidence of the light rays in a parallel beam does not exceed 15 to 20°. This structure constitutes the input of a photo-electric tube in which the light to be detected appears on the left-hand side of the structure in the direction of the arrow 14, while the vacuum 15 of the tube is present on the right-hand side of the structure. The substrate consists of a material which is transparent to visible light and the near infra-red (having a refractive index in the order of magnitude of 2), for example a lanthanum glass (to be compared with the refractive index in the order of magnitude of 3 of the photosensitive material). The anti-reflection layer 13 serves to adapt the substrate optically to the surroundings of the tube which is placed, for example, in air, or in a medium having a refractive index in the order of magnitude of 1, so that the reflection of the radiation at the interface substrate-exterior of the tube is reduced as much as possible. According to a first embodiment of the structure the photosensitive layer 12 consists of tri-alkaline material (a material comprising three alkali metals) of the chemical formula Sb $Na_2$ K, Cs, forming a layer of S 20 or S 25. The substrate is a glass having a high refractive index (for example a lanthanum glass having a index of 1.9) and the antireflection layer is of a known nature, for example, a layer of a material such as Mg $F_2$, $Na_3Al\ F_6$, Ca $F_2$, Sr $F_2$, Ba $F_2$, Al $F_3$, (Mg $F_2$, Ce $F_3$), or Th $F_4$.

While substrate plate 11 has been identified above as a lanthanum glass, it may also be a barium glass or a titanium glass with the index of refraction being in the order of 1.9.

FIG. 2 shows the relative value of the photo-electric efficiency $\rho\lambda$ at wavelength $\lambda$ of the radiation of such a photo-electric structure as a function of the thickness e of the photosensitive layer, which is plotted on the horizontal axis for three radiation wavelengths $\lambda=430$ nm, $\lambda=520$ nm, and $\lambda=800$ nm, respectively, situated in the blue, green and red parts, respectively, of the spectrum. The curves representing the efficiency for each of the wavelengths are the solid line curves 24, 25 and 26, respectively. These curves may be compared with the broken line curves 21, 22 and 23, respectively, denoting the photo-electric efficiency for the same wavelengths of the photo-electric structure comprising the same photosensitive layer which is deposited on glass having a refractive index of approximately 1.5 as a function of the thickness of the photo-electric layer. The comparison of these efficiencies is recorded in table I. With a so-called S20 layer which corresponds to a thickness of e=200 Å, the intensification in the blue is in the order of 20%. With an S25 layer which corresponds to a thickness of e=1200 Å, the intensification is in the order of 15% and 10% in the green and the red, respectively.

TABLE I

| Type of photoelectric layer | S 20 | S 25 | | bi-alkaline | |
|---|---|---|---|---|---|
| incident radiation | blue | green | red | blue | green |
| intensification | 20% | 15% | 10% | 8% | 6% |

FIG. 3 shows the spectral structure sensitivity according to the first embodiment for an S 20 layer and an S 25 layer, respectively, compared with the spectral sensitivity of the known structure comprising the same S 20 layer and the same S 25 layer, respectively, deposited on normal glass. The curves according to the invention are the solid-line curves 31 and 32 for the layers S 20 and S 25, respectively. The prior art curves are the broken-line curves 33 and 34, respectively.

According to a second embodiment the bi-alkaline photo-emissive layer 12 is of the type Sb $K_2$ Cs, $SbRb_2$ Cs, or $SbCs_3$ and the substrate 11 again is a glass having a high refractive index (for example, lanthanum glass having an index of 1.9), while the anti-reflection layer 13 is a known prior art anti-reflection layer.

FIG. 4 shows, in a manner which is comparable to that of FIG. 2, the photo-electric efficiencies for the two wavelengths $\lambda=430$ nm and $\lambda=520$ nm of the structure according to the invention and of the structure comprising the same photosensitive layer deposited on a glass having a refractive index of 1.5. The curves representing the photo-electric efficiency $\rho\lambda$ as a function of the thickness of the layer are 41, 42 for the structure according to the invention and 43, 44 for that of the known structure, respectively. The comparison of the results which are also summarized in table I gives an intensification of 8% in the blue and of 6% in the green for a thickness of the photo-electric layer e=175 Å.

FIG. 5 shows a third embodiment according to the invention. The structure comprises. on the side of the input face of the substrate, a light scintillator crystal 61 which is irradiated, for example, with X-rays or gamma rays. This crystal 61 may have the shape of a plane parallel plate. The crystal and the input face of the substrate of the photo cathode (structure), however, may have very different shapes; flat, spherical, concave, convex, etc. The material hereof has a high refractive index (in the order of 1.8), for example, that of chemical formula (CsI, Na) or (CsI, Tl). Thus the structure shows a good optical adaptation for the interface between scintillator and substrate of the photo cathode without the use of anti-reflection layers, as in the preceding embodiments in accordance with the invention.

What is claimed is:

1. A photoelectric detection structure comprising
   a substrate transparent to incident radiation in the visible and near infra-red radiation range, said substrate being lathanum glass, barium glass, or titanium glass with a refractive index of at most 2, and said substrate being of a shape to limit an angle of incidence of a radiation beam to at most 20°,
   means for reducing reflection at a first surface of said substrate in the direction of incidence of said radiation beam, and
   a photosensitive layer at a second opposite surface of said substrate.

2. A photoelectric detection structure according to claim 1, wherein said shape is a plane-parallel, a convex, or a concave shape.

3. A photoelectric detection structure according to claim 1 or claim 2, wherein said substrate has an index of refraction of substantially 1.9.

4. A photoelectric detection structure according to claim 1 or claim 2, wherein said means for reducing reflection consists of a plate of scintillator crystal provided against said substrate, said scintillator crystal having a refractive index of substantially 1.8.

5. A photoelectric detection structure according to claim 4, wherein said scintillator crystal has a chemical structure of (CsI, Na) or (CsI, Tl).

6. A photoelectric detection structure according to claim 1 or claim 2, wherein said means for reducing reflection includes an anti-reflection layer.

7. A photoelectric detection structure according to claim 1 or claim 2, wherein said photosensitive layer is a tri-alkaline photosensitive material.

8. A photoelectric detection structure according to claim 7, wherein said tri-alkaline material is SbNa$_2$K, Cs.

9. A photoelectric detection structure according to claim 7, wherein said photosensitive layer has a thickness corresponding to a photoelectric layer of the type S20 or S25.

10. A photoelectric detection structure according to claim 2, wherein said photosensitive layer is a bi-alkaline photosensitive material.

11. A photoelectric detection structure according to claim 10, wherein said bi-alkaline material is SbK$_2$Cs, SbRb$_2$Cs, or SbCs$_3$.

12. A photoelectric detection structure according to claim 10, wherein said photosensitive layer has a thickness of substantially 175 Å.

* * * * *